United States Patent [19]
Kozak et al.

[11] 3,922,525
[45] Nov. 25, 1975

[54] BIDIRECTIONAL SPIROMETER

[75] Inventors: Zdenek Vaclav Kozak; Joseph Jaromir Stupecky, both of North Hollywood, Calif.

[73] Assignee: Zdenek Kozak

[22] Filed: May 13, 1974

[21] Appl. No.: 469,388

[52] U.S. Cl. .......... 250/231 R; 73/231 R; 128/2.08; 250/233; 250/209
[51] Int. Cl.² .................................................. G01F 3/00
[58] Field of Search ............ 73/229, 231 R, 231 M, 194 C; 128/2.08; 250/209, 564, 573, 577, 231 R, 231 SE, 233

[56] References Cited
UNITED STATES PATENTS

| | | | |
|---|---|---|---|
| 3,036,460 | 5/1962 | White et al. | 73/155 |
| 3,680,378 | 8/1972 | Aurilio et al. | 128/2.08 X |
| 3,811,648 | 5/1974 | Ream, Jr. et al. | 250/209 X |

*Primary Examiner*—Walter Stolwein
*Attorney, Agent, or Firm*—John E. Wagner

[57] ABSTRACT

Disclosed is a moving vane type air flow sensor designed particularly for use in measuring inhalation and exhalation flow rates, respiratory rates and capacity of human lungs. Included in the combination is a tubular conduit or air passage and two sets of swirling stator vanes for imparting a helical flow to breath passing therethrough. A flow sensitive rotor is journaled for rotation responsive to air flow through the sensor. A pair of light sources and a pair of photo sensitive elements are arranged to detect movement in the rotor.

Disclosed also is circuitry for counting the number of revolutions of the rotor as an indication of flow through the sensor and logic circuitry for determining the direction of flow.

5 Claims, 10 Drawing Figures

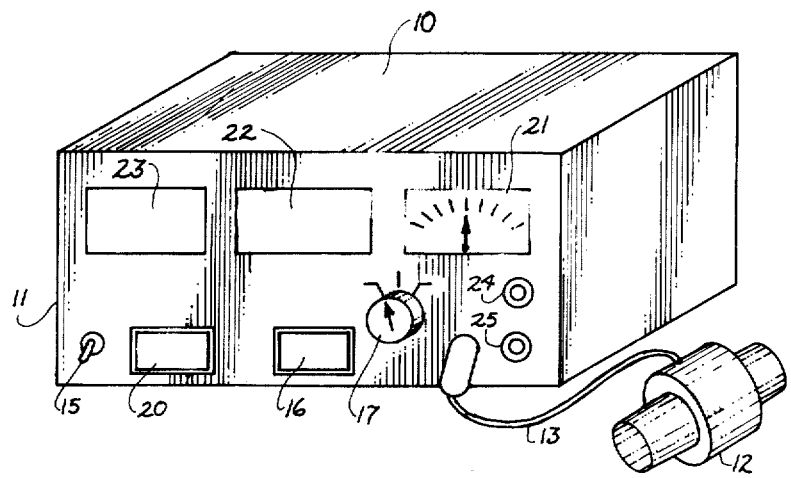
FIG. 1
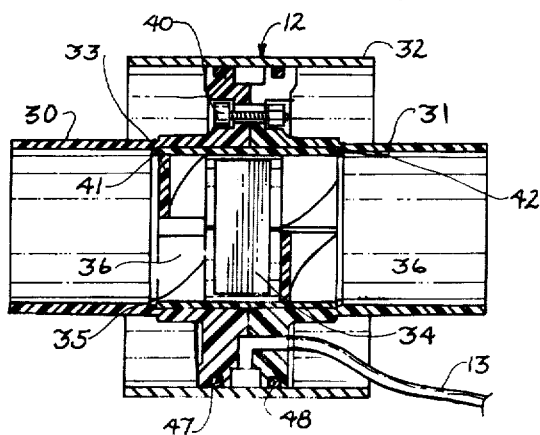
FIG. 2
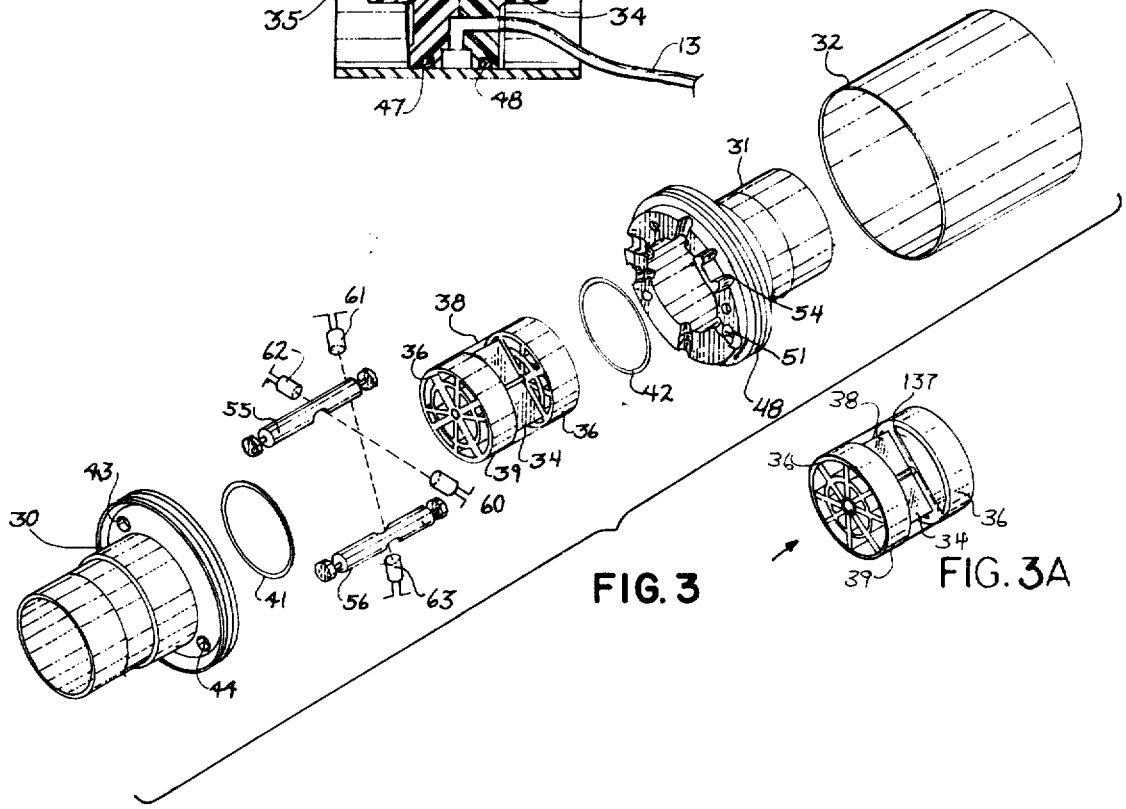
FIG. 3
FIG. 3A

BIDIRECTIONAL SPIROMETER

BACKGROUND OF THE INVENTION

Heretofore the measurement of the inhalation and exhalation flow rates, respiratory rates and volume of the human lungs has been accomplished in a number of ways. The basic and simplest form is a balloon or flexible bag into which a paitent is asked to breath employing a stop watch. Relatively crude measurements of lung capacity and rate can thus be obtained. Slightly more sophisticated devices employing a tank into which a patient exhales and volumetric measurements of a relatively precise nature can be obtained. Rotating vane spirometers have been employed which measure flow and rate of flow of the patient's breath as typified by our co-pending application, Ser. No. 218,094, filed Jan. 17, 1972, now U.S. Pat. No. 3,792,611, issued Feb. 2, 1974.

One of the features of our previous invention was the precise manner in which expiration air alone was measured and air movement through the sensor in the opposite direction was not detected. The foregoing system eliminated false readings, for a patient, during the expiration cycle, would take a small intake which could be detected as air flow through the sensor.

According to the latest results of research studies in pulmonary and lung medicine, one of the most important measurements is so called flow-volume loop diagram for both inhalation and exhalation. It means that values of flow rate and volume are continuously measured and recorded on X-Y plotter.

BRIEF STATEMENT OF THE INVENTION

We have discovered that employing the same basic sensor as disclosed in our earlier patent application but with the addition of a second set of swirling vanes, and a dual set of photo electric movement detectors and phase sensitive circuitry, a spirometer capable of determining precise inhalation and exhalation flow rates and volume can be achieved and thus the flow-volume loop measurements accomplished. The spirometer is sensitive to both directions of flow and is immune to errors in measurement due to sudden changes of direction of flow and accurately measures the counter flow. The sensing head is watertight and can be sterilized and rinsed in fluids.

RELATED INVENTIONS

This invention is an improvement on the unidirectional flowmeter of our co-pending patent application, Ser. No. 218,094, filed on Jan. 17, 1972, now U.S. Pat. No. 3,792,611 and divisional application, Ser. No. 361,539, filed May 18, 1973.

BRIEF DESCRIPTION OF THE DRAWINGS

This invention may be more clearly understood from the following detailed description and by reference to the drawings in which:

FIG. 1 is a front view of a spirometer incorporating this invention;

FIG. 2 is a longitudinal sectional view of the breath sensing head of the spirometer of FIG. 1;

FIG. 3 is an exploded view of the breath sensing head of this invention;

FIG. 3a is a perspective view of an alternative form of stator block designed for unidirectional flow measurements.

DETAILED DESCRIPTION OF THE INVENTION

Figure 4:
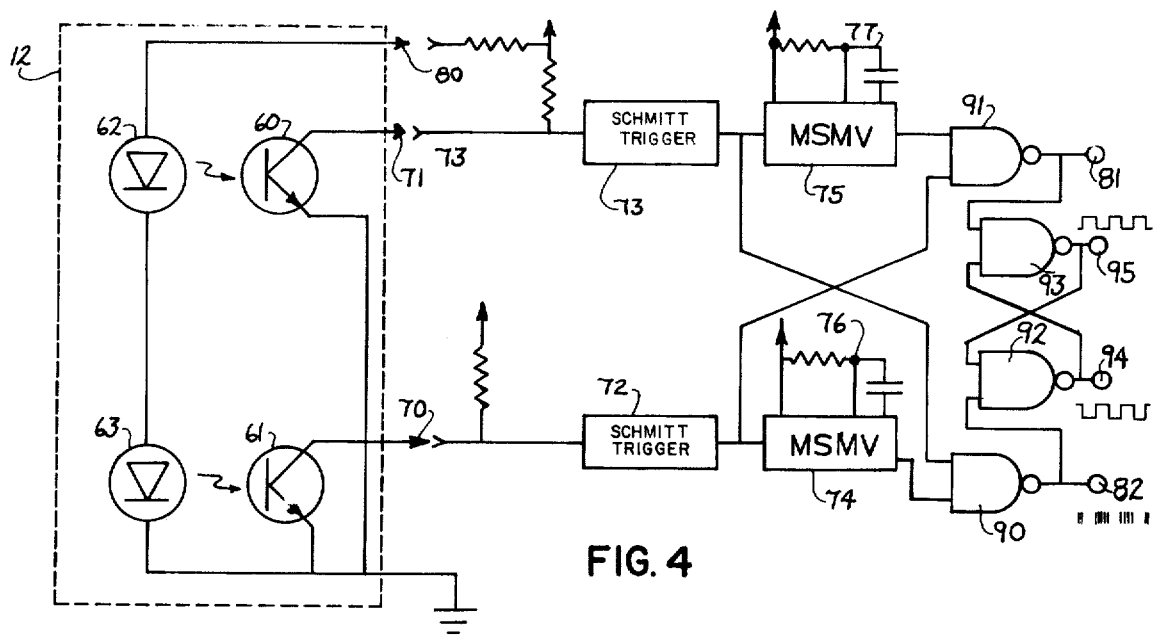
FIG. 4 is a block diagram of the electronics of the spirometer of FIG. 1.

Now referring to FIG. 1, electronic apparatus 10 is shown for measuring human lung vital capacity (VC) forced vital capacity (FVC), forced expiratory volume (FEV) peak flow, flow-volume loops, expiratory and inspiratory rates and volumes. This apparatus comprises an electronic circuitry, control and display assembly 11 and a breath sensing head 12 which are interconnected by electrical cable 13. The assembly 11 includes all controls, power supply and signal processing and display functions in addition to storage of the breath sensing head 12 in recess 14. The breath sensing head 12 contains a flow passage for breath, a turbine and photometric elements for measuring turbine speed and direction of flow.

The functional controls on the asembly 11 include and ON/OFF switch 15, a function (VC/FEV) selector switch 16, an ambient temperature selector knob 17 and a reset button 20.

The front face of the assembly 11 also includes a meter 21 for reading peak flow and a digital display 22 for displaying expiratory volume, vital capacity (VC) or forced expiratory volume (FEV) in liters and digital display 23 for displaying inspiratory volume. A pair of output terminals 24 and 25 provide analog and digital output signals of flow and volume to provide suitable inputs to an X-Y plotter to display flow volume characteristics of the patient's lungs.

The breath sensing head 12 is basically of the design disclosed in our co-pending application referenced above. Suffice it to say, in our previous invention the sensing head includes a set of swirling stator blades at the inlet end of the sensing head which impart a swirling motion to breath exhaled. The swirling flow imparts rotation to a turbine blade 34 axially journaled between the swirling stator and a set of fixed straight flow blades. The sensor in our previous invention responded to exhaled breath by rapid rotation of the turbine blade (up to 10,000 rpm) and virtually zero rpm on inhalation because the rotor aligns itself with a diametrical vane.

In accordance with this invention, both stator vanes 36 are of the swirling type with one pitched to impart a clockwise motion to the turbine blade and the other to impart a counter clockwise movement to the blade 34. The exhale and inhale flow rates are functions of the turbine blade velocities in the clockwise and counter clockwise directions. The respiration rate is a function of direction changes of rotation of the impeller 34. Expiration and inspiration volume is a function of the number of revolutions in the clockwise and counter clockwise direction respectively. The bidirectional operation allows continuous measurement of expiratory and inspiratory flowrates and volumes which can be recorded graphically resulting in so called flow-volume loop diagram. This diagram is very important for diagnosis of lung disease.

The features of this invention allowing dual directional monitoring of breath is best seen in FIG. 3. Specifically, the body parts 30 and 31 which are in the form of flanged tubes include longitudinally extending openings 43 and 44, 45 and 46 respectively as well as radial extending semicircle openings 50 and 54 of part 31. Part 30 includes mating openings.

Extending between openings 43 and 45 is a metal heat sink rod 55. A similar rod 56 extends through openings 44 and 46. The rods 55 and 56 each include radial openings in which light sources 62 and 63 are positioned to radiate narrow beams of light across the central region.

Figure 6:
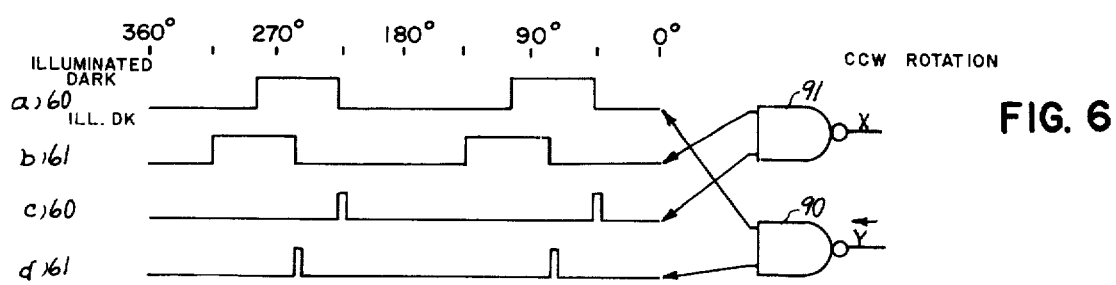

Photo diodes 60 and 61 are positioned opposite their respective light sources 62 and 63 to intercept the vane 34. Since the light sources 62 and 63 and photo diodes 60 and 61 are angularly spaced around the axis of the flow path through the breathing head, the interception of light and deenergization of the photo diodes will occur at different instants during each revolution and in different order depending upon the direction of rotation of the vane or turbine blade 34. This is more apparent in FIGS. 6-8 described below. Completing the breathing head 12 are a plurality of O ring seals 41 and 42 sealing the stator turbine assembly to the body pieces 30 and 31 and O rings 47 and 48 resting in grooves in the flange portions of the body parts 30 and 31 and sealing those parts to the sleeve or tube 32. Body parts 30 and 31 are clamped together by a plurality of bolts and nuts 40. Stator turbine assembly 39 consists of a transparent tube 38, counterbored on both ends to receive two sets of swirling stator vanes 36 and impeller 34. Simple exchange of a set of swirling stator vanes 36 for the diametrical vane of our copending application changes bidirectional sensor to unidirectional. Such a vane assembly is shown in FIG. 3a. It includes swirling 36, a rotor 34, a transparent sleeve 38 and a second stator 136. The stator 136 does not include swirling blades. Instead, it includes a single diametrical post 137. The post 137 does not interfere with rotation of the rotor 34 when air flow enters the sensor from the swirling fin end (in the direction of the arrow.) When so used, the apparatus will will measure air flow in the direction of the arrow.

Any counter-flow in the direction opposite to the arrow enters the end opening adjacent to the post 137 and flows past the rotor 34 in generally a axial direction. The light weight rotor is almost instantly aligned with the post 137 and is prevented from rotation. Thus, the apparatus has become a unidirectional measuring device. The stator assembly is a cylindrical shape and reversible to reverse, the direction of air flow measurement and this is simply accomplished by disassembly of the sensor head.

One other feature of this invention is apparent from examination of FIGS. 2 and 3. It may be seen therein that the fluid passage through the sensor is sealed by O rings 41 and 42. The electronics including the light sources and detectors are exposed to the fluid path through the sealed window of the stator body. The same electronic parts are also sealed from the exterior by the O rings 47 and 48. Therefore the sensing head is sealed and liquids may flow through the sensing head without endangering the electronic parts. Also, the sensing head is fully immersible for cleaning and sterilization purposes.

Figures 7, 8, 9:
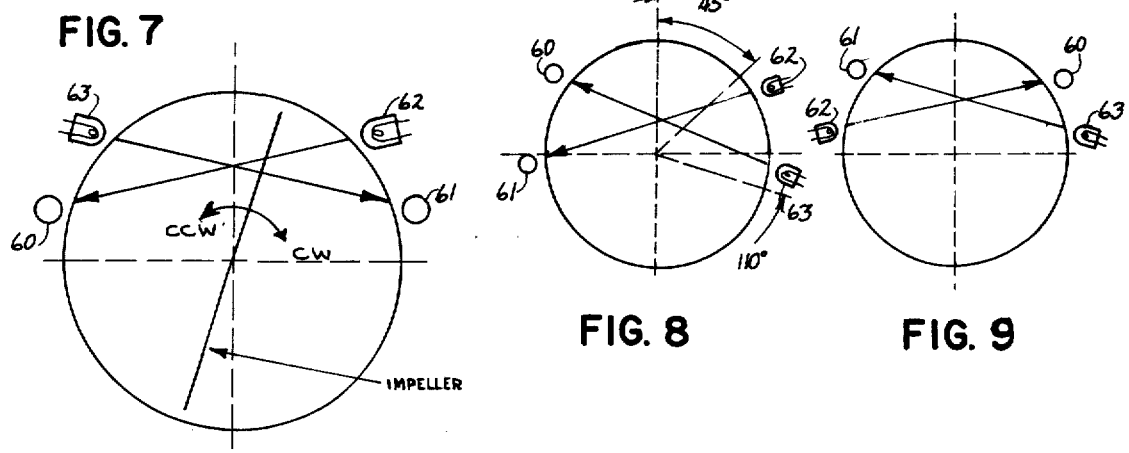
FIG. 7 is a simplified schematic representation of the arrangement of sensors and light sources of the breathing head.
FIGS. 8 and 9 are simplified schematic representations of second and third alternate arrangements of sensors and light sources of the breathing head.

FIG. 7 illustrates the operational position for the light sources 62 and 63 and photo detectors 60 and 61. In the arrangement of FIG. 7, the light sources 62 and 63 are symetrically arranged adjacent to the photo detector 61 and 60 associated with the other light source. Natural isolation of two adjacent near parallel devices is achieved. The light path for each is a sector of a circle intercepting the path of travel of the turbine blade 34.

The operation of this invention is best understood in conjunction with FIGS. 3 and 4. Referring now to FIG. 4, the breath sensing head 12 includes light sources 62 and 63 each directed at its respective photo detector 60 and 61. The light emitters 62 and 63 are both connected in series between ground and DC power supply 80 contained within the control assembly 11. The photo detectors 60 and 61 are similarly connected to ground and to respective power supplies 70 and 71. The photo detectors 60 and 61 are connected to drive respective Schmitt trigger circuits 72 and 73 which provide trigger pulses to a pair of mono stable multivibrators 74 and 75 each having their time constant resistance capacitance network 76 and 77. The mono stable multivibrators 74 and 75 each provide an input to respective NAND gate 90 and 91 with the second input to each NAND gate cross connected from the opposite trigger circuit 73 and 72. The output terminal 82 of the NAND gate 90 is a train of pulses proportional to the rotation rate of the turbine during inhalation. The output terminal 81 of NAND gate 91 provides a train of pulses proportional to the exhalation rate. The logic circuitry also includes a second pair of NAND gates 92 and 93, each having one input from the output of gates 90 and 91 and the second input cross connected from the output of the other gate 92 and 93. Terminal 94 of gate 92 thus produces pulses proportional to the respiratory rate and terminal 95 produces its complement.

Figure 5:
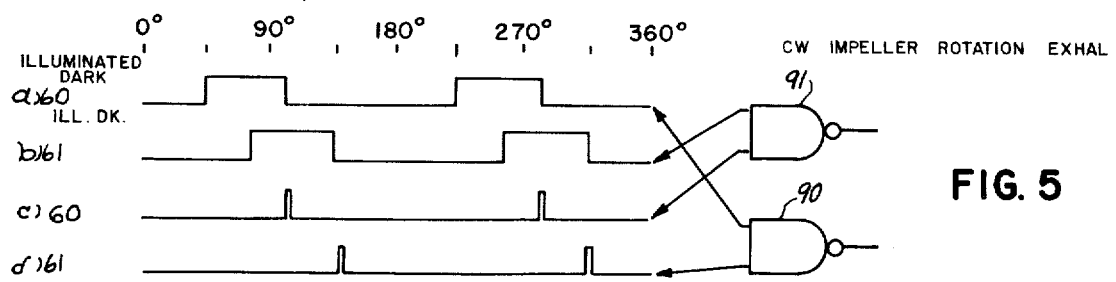
FIGS. 5 and 6 are graphical representations of the electrical signal output of significant portions of the circuitry of FIG. 4.

The sequence of pulses for clockwise rotation is illustrated in FIG. 5 with the light sources and photo detectors located and the following angular positions:

| DIRECTION OF ROTATION | ORDER OF INTERPRETATION, INTERRUPTION & REESTABLISHMENT |
|---|---|
| Clockwise | A |
|  | AB |
|  | B |
|  | A |
|  | AB |
| Counter-Clockwise | B |
|  | AB |
|  | A |
|  | B |

This order and the angles of illumination/dark for the photo detectors 60 and 61 are illustrated as the first two plots A and B of FIG. 5. The next plots C and D illustrate the time occurrence of the trigger pulses from the Schmitt triggers 72 and 73. The angular displacement of the two emitter-detector combinations results in the time/angle displacement of their output pulses. As may be seen comparing FIG. 5 with FIG. 6, a reversal of direction produces the same duration of cycles but in a reverse time/angle order thus allowing the detection of direction of rotation as well as velocity and number of revolutions able to be detected.

FIG. 7 as described above illustrates the preferred arrangement of light sources and photo detectors. Alternate versions are shown in FIG. 8 and 9.

In FIG. 8, an alternate arrangement of light sources and detectors is illustrated. Light sources 62 and 63 are positioned at angular positions of approximatley 45° and 110° while photo detectors 61 and 60 are located at approximately 260° and 315° respectively. In such a case, the heat generating devices, namely the light sources are remote from the photo detectors.

In FIG. 9, a symetrical array similar to FIG. 7 is illustrated with the light sources 62 and 63 positioned at the 275° and 85° positions and photo detectors 60 and 61 at 45° and 315° positions. It is apparent that a degree of freedom is possible in the positioning of the light sources and photo detectors provided they each intercept the turbine blade 34 at different angles of rotation whereby the phase information necessary for directional detection is possible. Other positioning of course may be used employing the concept of this invention.

The above described embodiments of this invention are merely descriptive of its principles and are not to be considered limiting. The scope of this invention instead shall be determined from the scope of the following claims, including their equivalents.

What is claimed is:

1. A dual directional flow sensor comprising a body having an axial bore defining a fluid flow path therethrough;
   a turbine mounted for rotation by fluid passing through said bore;
   said turbine including at least one blade;
   first means for imparting a helical flow to fluid passing through said bore to drive said turbine blade in one direction for fluid flow through said bore in said one direction;
   second means for imparting a helical flow to fluid passing through said bore to drive said turbine blade in the opposite direction for fluid flow through said bore in the said opposite direction;
   said first and second helical flow imparting means defining a symetrical flow path through said bore in both directions;
   a pair of movement sensors mounted adjacent to said bore and offset to the same side from the axis of said bore for detecting rotational movement of said turbine blades at different positions;
   said movement detectors, each comprising a light emitter and a light detector aligned on a sector path through said bore and intercepting the rotational path of said turbine blade, the light paths of each of said movement detectors following sector paths through said bore on the same side of said axis and generally opposite direction; and
   means responsive to the sequence of operation of said movement sensors for determining the direction of flow through said flow sensor.

2. The combination in accordance with claim 1 wherein said sequence responsive means comprising first and second monostable multivibrators;
   first and second trigger means connected to respective photo detectors and monostable multivibrators for switching the respective monostable multivibrator responsive to a predetermined degree of rotation of said turbine blade;
   first gate means operative in response to operation of said first monostable vibrator and said second trigger means for passing output pulses indicative of movement of said turbine blade in one direction, and
   second gate means operative in response to operation of said second monostable multivibrator and said first trigger means for passing output pulses indicative of movement of said turbine blade in the opposite direction.

3. The combination in accordance with claim 2 including third and fourth gate means with the output of one thereof connected to the input of the other and an enabling input of said third gate connected to the output of said first gate and an enabling input of said fourth gate connected to the output of said second gate.

4. The combination in accordance with claim 1 wherein said means for imparting helical flow comprise a pair of stators having fixed inclined vanes, each of said pair positioned at opposite sides of said turbine blade; and
   the vanes of one of said stators inclined to import fluid flow in the opposite direction from one inlet than from the other whereby the direction of movement of said turbine blade is determined by the incline of the vanes upstream from said turbine blade; and
   wherein said stators journal the blade of said turbine.

5. The combination in accordance with claim 1 wherein said movement sensors comprise two pair of radiation sources and radiation sensors positioned for radiation transverse to the axis of rotation of said turbine blade and mounted in sealed relationship within said body and in radiation transmission relationship with said turbine assembly.

* * * * *